July 2, 1963   E. E. FLANIGAN ETAL   3,095,706
GAS TURBINE FUEL NOZZLE COOLING
Original Filed Sept. 8, 1958   2 Sheets-Sheet 1

INVENTORS
Eugene E. Flanigan &
BY Richard M. Zeek

Paul Fitzpatrick
ATTORNEY

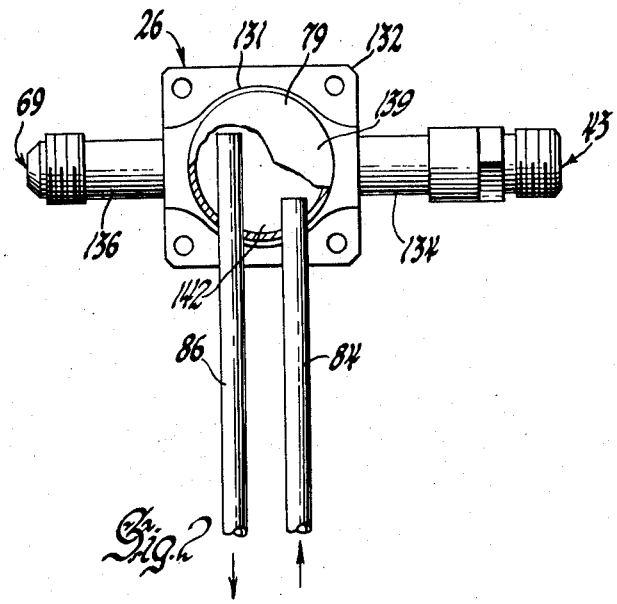
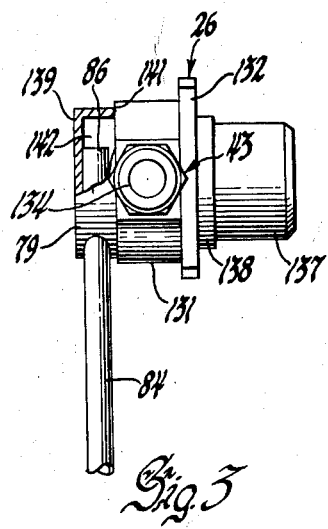
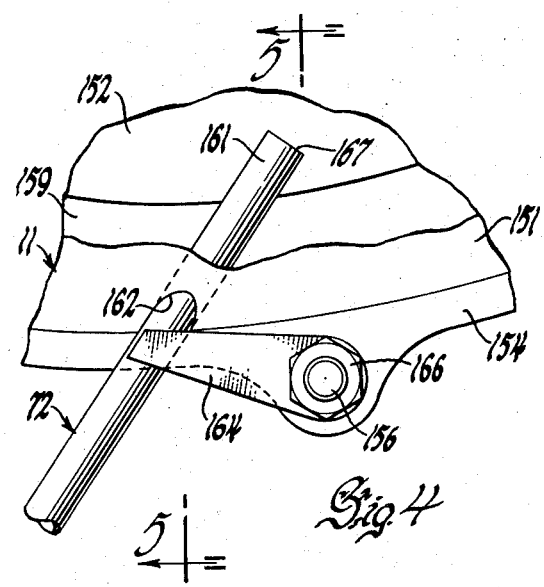
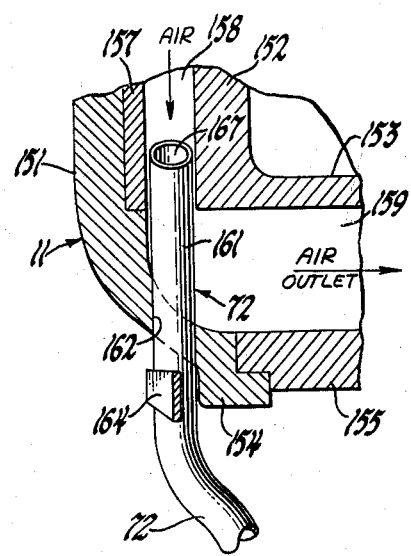

United States Patent Office 3,095,706
Patented July 2, 1963

3,095,706
GAS TURBINE FUEL NOZZLE COOLING
Eugene E. Flanigan, Detroit, and Richard M. Zeek, Utica, Mich., assignors to General Motors Corporation, Detroit, Mich., a corporation of Delaware
Original application Sept. 8, 1958, Ser. No. 759,689. Divided and this application Sept. 21, 1960, Ser. No. 57,505
2 Claims. (Cl. 60—39.66)

This application is a division of our application S.N. 759,689 filed September 8, 1958 (now Patent No. 2,976,683).

Our invention relates to fuel supply systems for gas turbine engines, particularly to improvements in the means for injecting or atomizing fuel. The fuel flow of such an engine under idling conditions is very small, making proper atomization of fuel difficult to achieve.

A difficulty experienced with the fuel nozzles arises from the fact that combustion air in a regenerative turbine is quite hot because of heating in the regenerator. Since the fuel flow is small, it does not suffice to cool the nozzle adequately, and trouble has been experienced with fuel vaporizing in the nozzles. Such vaporizing of fuel reduces the flow through the fuel nozzle. Reduced flow to any one nozzle resulting from vaporizing still further reduces the cooling of the nozzle by the fuel, so that the unbalance of fuel flow tends to worsen progressively. The fuel system of this invention cures this fault of previous systems by providing a cooler for each fuel nozzle which takes heat from the nozzle by direct heat exchange to prevent the temperature of the nozzle from rising to the boiling point of the fuel. Preferably, the fluid for cooling the nozzle is fuel supplied by the engine fuel pump in excess of that required for operation of the engine.

The nature and advantages of the invention will be apparent to those skilled in the art from the succeeding detailed description of a preferred embodiment of the invention and the accompanying drawings thereof.

FIGURE 2 is an end view of a cooled fuel atomizing nozzle.

FIGURE 3 is a side view of the same.

FIGURE 4 is a fragmentary front elevation view, with parts cut away, of the diffuser portion of the centrifugal compressor of the engine illustrating the atomizing air pickup.

FIGURE 5 is a sectional view of the same taken on the plane indicated by the line 5—5 in FIGURE 4.

Figure 1:
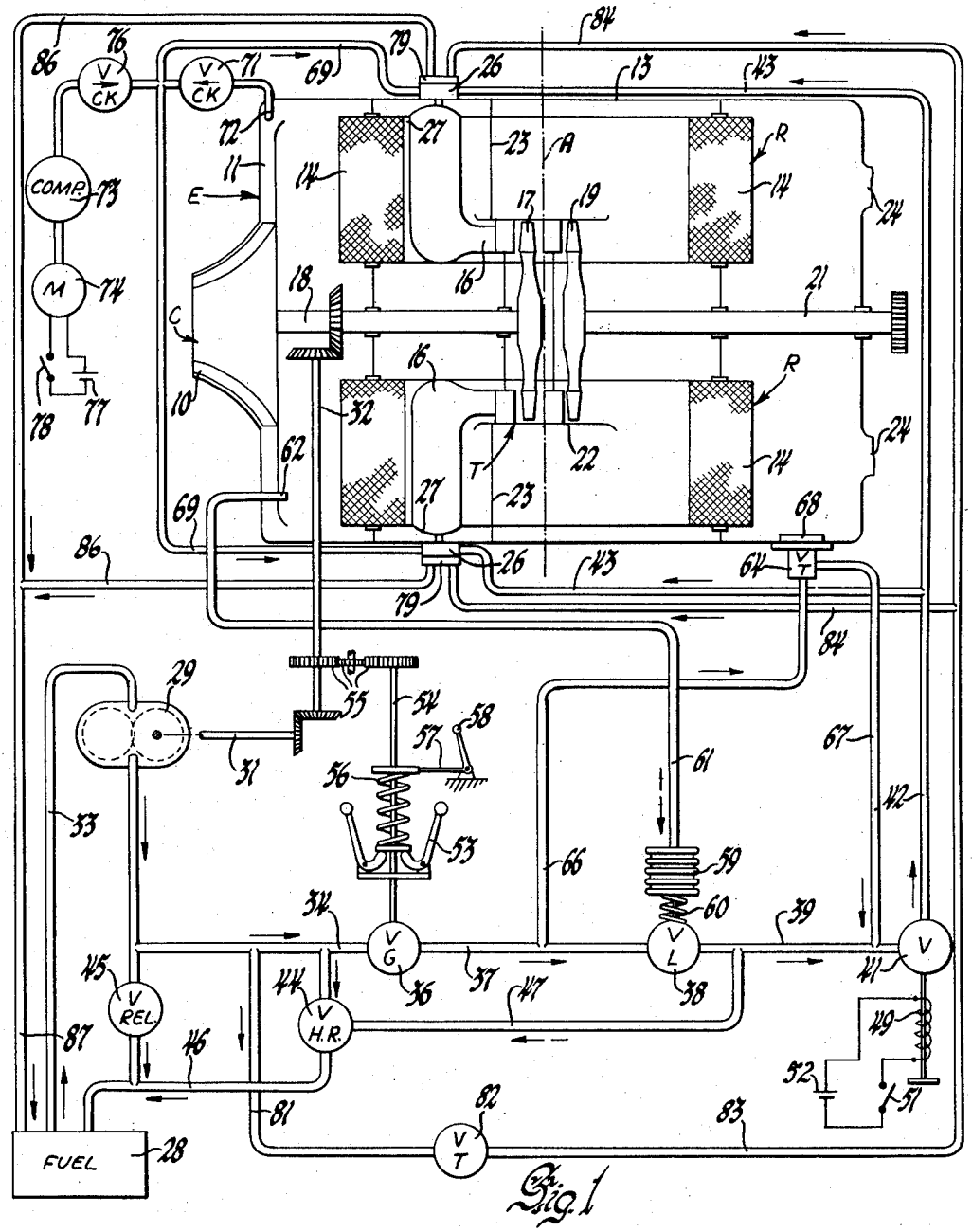
FIGURE 1 is a schematic diagram of a regenerative gas turbine engine of known type and a fuel system therefor including the invention.

Referring first to FIGURE 1, the engine to which the invention is applied may be described briefly. Such an engine is described in U.S. patent application (now abandoned) Serial No. 559,475, filed January 16, 1956, of common ownership with this application. The engine E comprises a centrifugal compressor C including a rotor 10 discharging into a radial diffuser 11. Compressed air is discharged from the outer part of the diffuser into an engine case 13 within which is mounted a regenerator R including two rotary matrices or drums 14 having an axis of rotation A. Air flows through the regenerator into combustion apparatus 16 which discharges into a turbine T. The turbine includes a nozzle discharging into a first or compressor turbine wheel 17 connected by a shaft 18 to the compressor rotor. The gas discharged from the compressor turbine passes through a second nozzle and a power turbine wheel 19 mounted on a power output shaft 21. The turbine nozzles are supported in a case 22 mounted in a diaphragm 23 which mounts main or diaphragm seals through which the regenerator drums pass. Gas exhausted from the turbine flows through the regenerator matrices 14 into the portion of the case 13 rearwardly of the diaphragm which may be termed an exhaust collector, and through suitable exhaust gas outlets indicated at 24.

Suitable bulkheads and bypass seals are provided to insure that the gas flowing from the compressor to the combustion apparatus and from the turbine to the exhaust passes through the regenerator matrices, which are rotated slowly about their axis when the engine is in operation.

The combustion apparatus 16 may comprise two or more flame tubes 27, two being illustrated. Fuel is supplied to each flame tube by a fuel nozzle 26 mounted on the engine casing and projecting into the flame tube 27, within which combustion takes place.

Fuel is supplied to the engine from a tank 28 by a positive displacement pump 29, which may be driven by the engine. As illustrated, the pump is driven by a shaft 31 geared to an accessory drive shaft 32 geared to the compressor turbine shaft 18. The capacity of the pump is greater than the fuel requirement of the engine.

Pump 29 draws fuel from the tank through a line 33 and discharges it through a line 34, a governor valve 36, line 37, a fuel limiting valve 38, line 39, a shutoff valve 41, line 42, and branch lines 43 to the fuel nozzles. Excess fuel is returned from line 34 to the fuel tank through a head regulating valve 44 and return line 46. The head regulating valve is a common component of such fuel systems. It responds to pressure in the line 34 upstream of valves 36 and 38 and to the pressure in line 39 downstream of the valves, which is communicated to valve 44 through the pressure line 47. Valve 44 bypasses sufficient fuel through return line 46 to maintain a substantially constant pressure drop or head through the metering valves 36 and 38. Valve 41 is a shutoff valve which is closed when the engine is out of operation and is opened during the starting cycle of the engine to allow fuel to flow to the nozzles. As indicated, this valve is controlled by a solenoid 49 connected by a switch 51 to suitable current source 52. An emergency relief valve 45 is provided between the pump outlet line 34 and return line 46.

Governor valve 36 may be any suitable throttling valve provided with a variable speed governor actuating means. It acts to maintain the speed of turbine 17 at the desired value. As illustrated schematically, valve 36 is controlled by flyweights 53 mounted on a shaft 54 coupled by gears 55 to the accessory drive shaft 32. The force of flyweights 53 is opposed by a speeder spring 56 loaded by an arm 57 coupled to a suitable pedal or manual control 58. The control may adjust the setting of the governor spring from a minimum setting corresponding to idling operation of the engine to a maximum setting corresponding to the maximum desired speed of turbine 17.

The fuel limiting valve 38 is a fuel metering device provided to regulate the fuel supply of the turbine to retain it in proper relation to the air flow through the engine so that excessive temperature of the motive fluid entering the turbine is prevented. While many arrangements for this purpose are known, for the purpose of the particular control illustrated herein valve 38 is a simple throttling valve actuated by a bellows or other expansible chamber motor 59 opposed by a spring 60 and connected by a pressure line 61 to a probe 62 which picks up compressor discharge pressure from within the engine case 13. The valve is so constructed or contoured that, as the pressure increases and the bellows is expanded, the throttling valve opens to maintain a substantially constant ratio of fuel to air. It will be apparent that the detailed structure of the valve 38 and bellows or other motor 59 is immaterial to this invention.

A thermal compensating or start compensating valve 64 is connected in parallel with valve 38 by lines 66 and 67. The compensating valve is a throttling valve of small capacity controlled by a temperature responsive element 68, preferably mounted in the exhaust section of the engine near the regenerator so as to be swept by turbine exhaust gas which has passed through the regenerator. Temperature responsive element 68 is also affected by heat radiated from the matrix 14. When the engine is hot, element 68 closes valve 64. However, if the engine is out of service for a time sufficient to cool, valve 64 will open when the engine is started. The fuel system including the valve 64 is the subject matter of our Patent No. 2,976,683, which discloses preferred structure of the valve.

The air supply arrangement for the fuel nozzles is also shown schematically in FIGURE 1. The fuel nozzles 26 have air supply lines 69 which are normally supplied through a check valve 71 from a total pressure probe 72 in the diffuser 11 of the compressor. The structure and installation of this probe will be described more fully; but, for the present, it is sufficient to point out that this probe is installed so as to take off the maximum total pressure available in the compressor and to provide a relatively small quantity of air for fuel atomization. As a practical matter, two or even more probes 72 may be installed and connected in parallel to the check valve 71, depending upon the dimensions of the diffuser and the amount of air required. By recovering the velocity head of the air very effectively in probe 72, pressure may be attained which is sufficiently higher than the pressure within the flame tube 27 to provide a high velocity air stream which will serve to atomize the fuel in the nozzles 26. This pressure head results from the higher efficiency of pressure recovery in the probe to that in the engine case in the main outlet of the diffuser, and also to some extent from the pressure drops caused by flow through the matrix 14 and the wall of the flame tube 27. This atomizing head is not available when the engine is being started, so for starting purposes an auxiliary air compressor 73 driven by a motor 74 and connected through check valve 76 to lines 69 is provided. Motor 74 may be energized from a suitable power source 77 by a switch 78. Motor 74 may, if desired, be the starting motor provided to start the engine. When the engine has been brought up to idling speed, motor 74 may be deenergized and the atomizing air is derived from the probe 72. The check valves 71 and 76 simply serve to prevent diversion of air supplied by either source. This air supply system is the subject of our companion application S.N. 57,506, filed September 21, 1960.

The cooling arrangement for the fuel nozzles 26 involves structure which will be described subsequently. So far as the system shown in FIGURE 1 is concerned, each nozzle has fixed to it a cooler 79, through which cooling fluid is circulated. While any fluid might be used, it is both convenient and desirable to use excess fuel discharged by pump 29. Nozzle cooling fuel is taken off by branch pipe 81 from the pump discharge line 34 and supplied through a throttle or regulating valve 82, line 83, and branch lines 84 to the coolers. Fluid is discharged from the coolers through lines 86 and 87 to the fuel tank. Valve 82 may be provided to control the amount of fuel circulated for cooling, or it may be omitted, the flow, in that case, being determined by the pressure of the pump discharge and the resistance to flow of the supply and return lines to the coolers.

Referring to FIGURES 2 and 3, these illustrate a preferred structure of fuel nozzle cooling means 79 associated with a fuel nozzle 26 of an air-atomizing spray type. The nozzle 26 comprises a body 131 having a flange 132 with bolt holes through the flange for mounting the nozzle on the engine case. Fuel is admitted to the nozzle through an inlet connection 134 which connects to the fuel line 43, and compressed air is applied through an inlet fitting 136 which connects to the air line 69. The nozzle comprises a spray head 137 extending from the body from the end of which the fuel is sprayed into the combustion liner 27. The combustion liner has an opening in the wall thereof which pilots over the spray head 137 and against a shoulder 138. The internal structure of the nozzle by which the spray is produced is not illustrated or described, since it is entirely immaterial to the present invention. Such nozzles are well known to the art and may be procured. The part of the nozzle assembly with which the present invention is concerned lies in the cooler and its combination with the nozzle. The particular form of cooler 79 which is adapted to cooperate with the particular configuration of nozzle illustrated comprises a shallow metal cup 139, the rim of which is brazed at 141 to the outer face of the nozzle body. The cooler also comprises a fluid inlet tube 84 and a fluid outlet tube 86, which are small diameter metal tubes extending through openings in the lower portion of the rim of the cup and which are brazed around the entrance and brazed to the bottom surface of the cup to prevent leakage and to secure a strong joint between the tubes and the cup. It will be noted that tube 84 projects somewhat tangentially into the chamber 142 within the cooler so as to set up a swirling flow of liquid in the cooler and that the outlet 86 extends near the top of the chamber 142 so as to trap a small amount of fluid in the cooler.

As previously stated, tube 84 is connected to a suitable source of liquid at low temperature which by contact with the outer wall of the nozzle body 131 greatly reduces the temperature of the nozzle, which is heated both by the hot air supplied to the combustion chamber and by exposure of the nozzle tip to radiation from the flame within the combustion chamber. Preferably the cooling fluid is excess fuel displaced by pump 29 and the cooling fluid is returned to the fuel tank 28.

It is appreciated that fuel nozzles of a return-flow type are cooled to some extent by the excess fuel supplied to them. However, such fuel nozzles have their disadvantages, among them being the need for a more complex fuel system to balance the discharge from the nozzles. The cooling system of this invention provides adequate cooling by very simple structure without incurring the disadvantage of return-flow nozzle systems.

Referring to FIGURES 4 and 5, these figures illustrate a part of the outlet portion or diffuser 11 of an axial flow compressor of the type disclosed in the previously mentioned application Serial No. 559,475 sufficient to explain the installation of the air pick-up tube. The compressor case may comprise a front wall 151 and a rear wall 152, the outer portions of which are substantially flat plates between which the air flows radially and with a circumferential component of motion after it is discharged from the compressor rotor 10. Plate 152 has a rearwardly directed flange 153 and plate 151 has a flange 154 which bolts to a portion 155 of the engine case, as by studs 156 and nuts 166 distributed around the plate. A diffuser plate 157 mounted between plates 151 and 152 mounts vanes (not shown) which define diffusing paths through the space between plate 157 and plate 152. An annular air outlet 159 is defined between the flange 153 and case 155. The pick-up tube 72 is of very simple structure, consisting of a length of tubing 161 which extends through a drilled opening 162 in the flange 154. A bracket 164 welded to the tube 161 is drilled to fit over one of the studs 156 and be retained by the nut 166. As will be apparent, the open end 167 of the tube extends a short distance into the diffuser and is directed substantially into the direction of the air flow radially and circumferentially of the diffuser so that it receives the air with a minimum of loss of velocity head. The air entering the tube 161 is slowed to a very low velocity and the velocity head is thus recovered. Depending upon the air flow required and the dimensions of the diffuser air passage, one or more pick-up tubes 161 may be provided. The outer end of tube 161 may be provided with a suitable fitting (not shown) by which it is connected directly or indirectly to the check valve 71, as illustrated in FIGURE 1.

By thus providing an air pick-up tube so located as to convert substantially all of the velocity head of the air into pressure head, a pressure sufficiently above that within the flame tube 27 may be provided to successfully atomize the fuel. This makes it possible to eliminate additional compressors which have been used previously for this purpose, except, of course, that an auxiliary compressor is needed for starting. This auxiliary compressor 73 may be shut off as soon as the engine is in idling operation.

It will be seen that the invention is particularly well adapted to the requirements of regenerative gas turbines such as may be used for automobiles and similar installations. The invention overcomes several difficulties which have been encountered with the fuel systems thereof because of the heat retaining characteristics of the matrix, the high temperature of the air delivered to the combustion apparatus, and the very small fuel requirement of such an engine under idling conditions when the matrix has become hot.

The detailed description of the preferred embodiment of the invention for the purpose of explaining the principles thereof should not be regarded as limiting the invention. Many modifications of structure may be made by the exercise of skill in the art within the scope of the invention.

We claim:
1. A fuel spray nozzle for a gas turbine engine comprising, in combination, a fuel nozzle body adapted to be mounted on an engine, a spray head projecting from the body and adapted to extend into the engine for discharge of fuel into the engine, and a cooler fixed to the body comprising a cup means providing a chamber one wall of which is defined by the body, an inlet conduit for cooling fluid entering the chamber, and an outlet conduit for cooling fluid communicating with the chamber, the inlet conduit being so disposed in the chamber as to impart swirling motion to cooling fluid circulating through the chamber.

2. A fuel spray nozzle for a gas turbine engine comprising, in combination, a fuel nozzle body adapted to be mounted on an engine, a spray head projecting from the body and adapted to extend into the engine for discharge of fuel into the engine, and a cooler fixed to the body comprising a cup means providing a chamber one wall of which is defined by the body, an inlet conduit for cooling fluid entering the chamber, an outlet conduit for cooling fluid communicating with the chamber, the inlet conduit being so disposed in the chamber as to impart swirling motion to cooling fluid circulating through the chamber, and means for supplying fuel to the inlet conduit under pressure independent of fuel supplied to the nozzle for discharge into the engine.

References Cited in the file of this patent
UNITED STATES PATENTS

| | | |
|---|---|---|
| 2,541,108 | Sforzini | Feb. 13, 1951 |
| 2,578,934 | Jansen | Dec. 18, 1951 |
| 2,633,327 | McDowell | Mar. 31, 1953 |
| 2,819,588 | Sarto | Jan. 14, 1958 |

FOREIGN PATENTS

| | | |
|---|---|---|
| 763,449 | Great Britain | Dec. 12, 1956 |